(No Model.)  2 Sheets—Sheet 1.

J. H. BARR, Dec'd.
J. M. BARR, Administrator.
AUTOMATIC BOILER CLEANER.

No. 528,283. Patented Oct. 30, 1894.

Witnesses
W. S. Hulse
E. L. Coolican

John H. Barr  Inventor
By H. C. Hartman
his atty.

(No Model.) 2 Sheets—Sheet 2.

J. H. BARR, Dec'd.
J. M. BARR, Administrator.
AUTOMATIC BOILER CLEANER.

No. 528,283. Patented Oct. 30, 1894.

Witnesses
W. S. Hulse
E. C. Coolican.

John H. Barr Inventor
By H. C. Hartman
his atty.

UNITED STATES PATENT OFFICE.

JOHN H. BARR, OF ROANOKE, INDIANA; JOHN M. BARR ADMINISTRATOR OF SAID JOHN H. BARR, DECEASED.

AUTOMATIC BOILER-CLEANER.

SPECIFICATION forming part of Letters Patent No. 528,283, dated October 30, 1894.

Application filed July 10, 1893. Serial No. 479,982. (No model.)

*To all whom it may concern:*

Be it known that I, JOHN H. BARR, a citizen of the United States, residing at Roanoke, in the county of Huntington, in the State of Indiana, have invented certain new and useful Improvements in Automatic Boiler-Cleaners; and I do hereby declare that the following is a full, clear, and exact description of the invention, which will enable others skilled in the art to which it appertains to make and use the same, reference being had to the accompanying drawings, which form part of this specification.

My invention relates to improvements in automatic boiler cleaners in which the foul water and floating substances are caused to pass out into a precipitator, and the purified waters are returned therefrom to the boiler. Its objects are to provide, first, an improved precipitating vessel or vessels, and, second, an improved trap or collector for impure water to pass into and out through the out-flow pipe; and the invention consists in the construction and novel combination of parts hereinafter described, pointed out in the appended claims, and illustrated in the accompanying drawings, in which—

Figure 1:
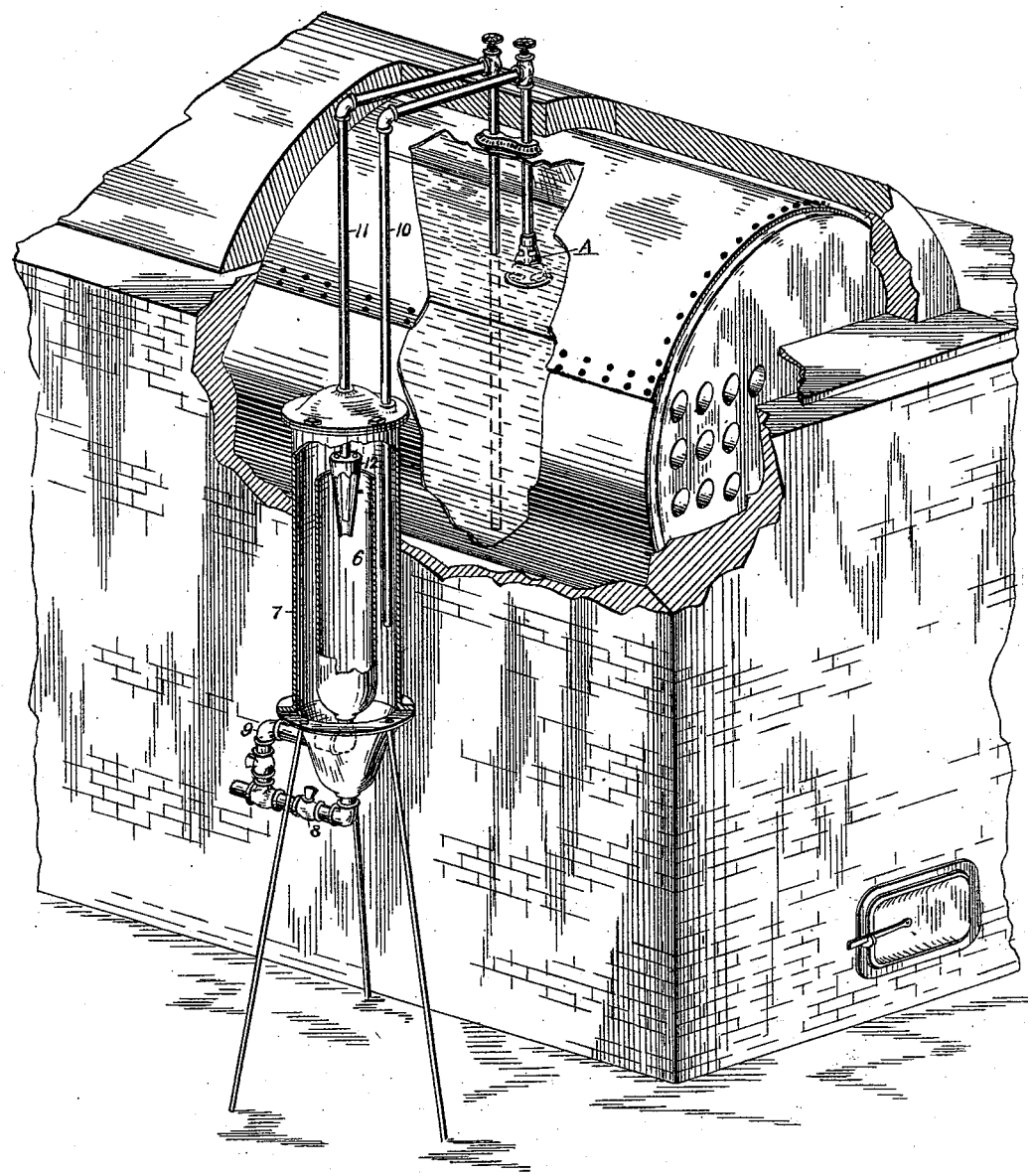
Figure 3:
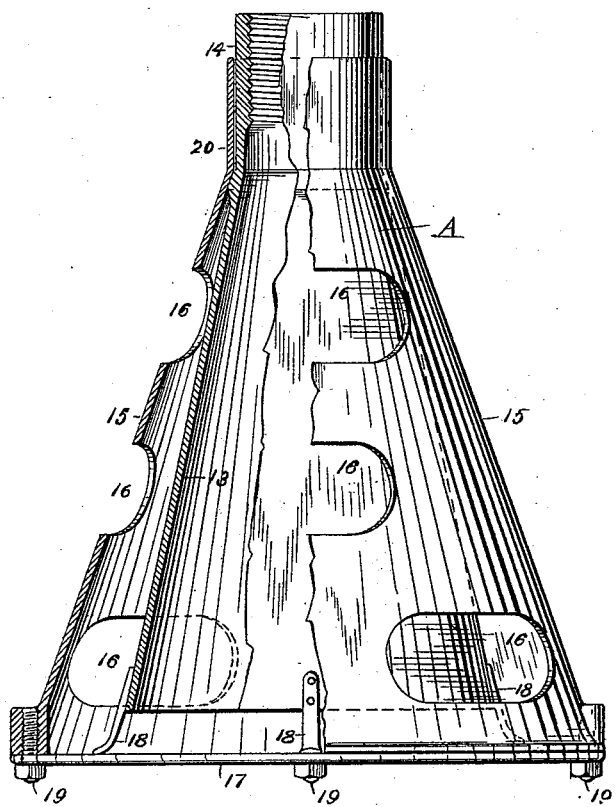
Figure 2:
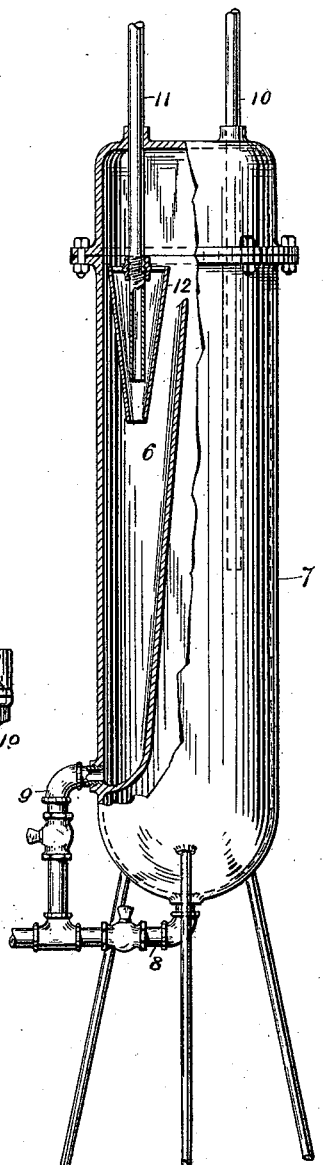

Figure 1 is a vertical section of my improved boiler cleaner attached to a boiler, whose side is partly broken away to show the connection. Fig. 2 is another form of the precipitating vessels with parts broken away, and Fig. 3 is a side view of my improved collector vessel or trap with parts broken away to show construction.

Similar numerals and letters of reference refer to similar parts throughout the several views.

My improved precipitating or settling vessel consists essentially in placing one chamber or vessel 6 inside of a larger chamber or vessel 7, so that the inclosed chamber or vessel 6 shall receive water from the inclosing vessel 7 only by over-flow into its open upper end placed near the top of the inclosing vessel 7.

The forms of the two vessels 6 and 7 are immaterial.

I have illustrated two forms of the inclosed vessel 6 in the drawings.

In Fig. 1 the vessel 6 is in form of an upright cylindrical vessel placed centrally within an upright inclosing chamber or vessel 7.

In Fig. 2 the chamber or vessel 6 is a chamber formed on one side of the inclosing vessel 7.

8 is the discharge pipe of the vessel 7, and 9 the discharge pipe for the vessel 6, attached to and communicating with the pipe 8 for convenience. Both these pipes have stopcocks for operating.

10 is the out-flow pipe through which the water flows out of the boiler into the vessel 7. This pipe is extended into the vessel 7 to a point below the top of the vessel 6, so that the discharge of water through it shall be confined to the vessel 7.

11 is the return pipe through which the purified water is returned to the boiler—one end of which extends into the boiler to a point always below the surface of the water, and the other end extends through the upper part of the vessel 7 into the vessel 6, terminating a short distance below its mouth or open end. To this end I attach a scum shield 12 consisting of a case or tube of an area preferably twice that of the return pipe 11 and open at both ends, and placed so that one end extends above the mouth of the inclosed vessel 6 and the other end extends below the end of the return pipe to a point beneath any scum or other floating materials, so that the water passing up within the shield to the return pipe 11 shall not carry floating substances with it.

The trap A, Fig. 3, consists of a cone-shaped receiver 13 secured to the out-flow pipes 10 so as to form its only inlet. Around it I place a case 15, so as to form a space all around between them for the flow of water and scum. This case 15 is provided with a bottom 17, preferably removably attached by bolts 19 and with apertures 16 arranged around it at different and graduated heights, forming its ports or inlets. The adjustment of the bottom 17 to the bottom of the receiver provides a space between them, preferably one quarter of an inch, for the flow of water into the receiver 13. Such distance is maintained preferably by lugs or projections 18 attached to the lower rim of the receiver 13.

The upper part of the case 15 is preferably provided with a collar 20 adapted to fit removably over the neck 14 of the receiver 13. The advantages of these preferable constructions are, that when the parts are fastened together as shown in the drawings, the bottom 17 is prevented from closing the space between it and the rim of the cone receiver 13, by the projections 18, which hold the rim at a fixed distance above said bottom, providing a fixed space or entrance for the inflow of water and scum from the vessel 15 into the receiver 13. When it is desired to clean this trap, it is taken off from the outflow pipe 10 and the bottom 17 removed. The case 15 can then be lifted off from the cone receiver 13 and all of the parts thoroughly cleaned, and if necessary repaired. This trap is placed in the boiler so that the average water line is half way between the highest and lowest ports 16. This gives a variation of rise and fall of the water of about four inches, without affecting the operation. The particular function of this trap is, to take the water always from the ports 16, which are nearest to or at the surface of the water, and from thence into the receiver 13, whereby the surface water and scum are directed and led into the out-flow pipe.

The operation is as follows: The device being in place as shown in Fig. 1, the water as soon as it becomes heated in the boiler and begins to form steam, circulates by well known laws from its surface in the boiler through the trap as described, on into the out-flow pipe 10 and over into the vessel 7. This vessel 7 being of much larger area and volume than the pipes 10 and 11, the flow of the water in the vessel 7 upward and over into the vessel 6 is very much retarded, whereby the sediment contained in the water is precipitated to the bottom of the vessel 7. The water passes on up in the vessel 7 and overflows at a point where the water is freest from sediment into the vessel 6, which having a larger space in area than the return pipe, a second settling takes place in the vessel 6, and from thence the water passes from a point where it is purest into the return pipe 11 back into the boiler, clear and free from sediment, and also clear and free from magnesia, lime and floating substances which are retained in the vessel 6 by the scum shield 12.

Having thus described my invention, what I claim as new, and desire to secure by Letters Patent, is—

1. In an automatic boiler cleaner a trap for the inflow of water from the boiler to the outflow pipe connected thereto and consisting of a cone shaped receiver as 13: an inclosing case for said receiver adapted to form a space for the flow of water and scum around said receiver, and provided with apertures arranged at different and graduated heights forming the only ports to said space: a bottom for said inclosing case placed below the rim of said receiver, so as to permit water and scum to pass freely into the receiver.

2. In an automatic boiler cleaner a scum shield for the end of the pipe through which the water flows back from the settling vessel or vessels into the boiler, consisting of a case or tube inclosing the end of said return pipe within the settling vessel so as to provide a space for the flow of water within it around the said end and extended above and below said end of the return pipe so as to prevent scum and floating substances from entering said space and said return pipe; in combination with a settling vessel: an out-flow pipe from the boiler to a settling vessel, and a return pipe one end of which is placed in the settling vessel where the water is freest from sediment and the other end at a point within the boiler always submerged in the water.

3. An automatic boiler cleaner consisting of a settling chamber or vessel placed or constructed within a larger settling vessel so that the water enters the inclosed chamber or vessel only by over-flowing into it from the inclosing vessel: an out-flow pipe 10: a return pipe 11: a scum shield as 12, located in the top of the vessel, attached to the return pipe near the top of the vessel into which the water enters by over-flow, and adapted to prevent scum and other substances from entering the return pipe and a boiler trap attached to the outflow pipe within the boiler consisting of the receiver 13, and the inclosing case 15.

4. In an automatic boiler cleaner of the class described: a boiler trap attached to the outflow pipe with the boiler, consisting of the receiver 13, the inclosing case 15 provided with the ports 16 and the removable bottom 17.

5. In an automatic boiler cleaner a settling vessel consisting of the chambers or vessel 6 placed or constructed within a larger settling vessel 7, so that the water enters the vessel 6 by over-flow into it from the vessel 7: an out-flow pipe from the boiler adapted to discharge into the vessel 7, and a return pipe to the boiler adapted to take the return flow of water from near the top of the vessel 6, and a scum shield as 12, attached to the inlet end of the return pipe, near the top of the vessel into which the water enters by over-flowing, substantially as described.

In testimony whereof I hereunto subscribe my name, in the presence of two witnesses, this 2d day of July, A. D. 1893.

JOHN H. BARR.

Witnesses:
H. C. HARTMAN,
E. C. COOLICAN.